(12) United States Patent
Hall et al.

(10) Patent No.: US 8,708,549 B2
(45) Date of Patent: *Apr. 29, 2014

(54) MIXING BOWL COOLING JACKET WITH TURBULENCE INDUCING STRUCTURES

(75) Inventors: Michael Hall, Sidney, OH (US); Josh Ludwig, Sidney, OH (US); Eric Weatherhead, Sidney, OH (US)

(73) Assignee: Schaffer Manufacturing Company, Urbana, OH (US)

( * ) Notice: Subject to any disclaimer, the term of this patent is extended or adjusted under 35 U.S.C. 154(b) by 858 days.

This patent is subject to a terminal disclaimer.

(21) Appl. No.: 12/566,777

(22) Filed: Sep. 25, 2009

(65) Prior Publication Data

US 2011/0075509 A1    Mar. 31, 2011

(51) Int. Cl.
*B01F 15/06* (2006.01)

(52) U.S. Cl.
USPC .......................................... 366/149; 165/169

(58) Field of Classification Search
USPC .................. 366/149; 62/342, 343; 165/109.1, 165/168–171
See application file for complete search history.

(56) References Cited

U.S. PATENT DOCUMENTS

| | | | | |
|---|---|---|---|---|
| 1,726,458 A * | 8/1929 | Tellander | ...................... | 165/170 |
| 2,265,552 A * | 12/1941 | Sticelber | ......................... | 62/63 |
| 2,274,220 A * | 2/1942 | Sticelber | ......................... | 62/63 |
| 2,415,711 A * | 2/1947 | Sticelber | ........................ | 62/342 |
| 2,504,465 A * | 4/1950 | Sticelber | ...................... | 165/136 |
| 3,126,054 A * | 3/1964 | Paules | ....................... | 165/109.1 |
| 3,310,106 A * | 3/1967 | Leseelleur et al. | ............ | 165/169 |
| 4,002,200 A * | 1/1977 | Raskin | ......................... | 165/131 |
| 4,159,740 A * | 7/1979 | Seiling | ......................... | 165/147 |
| 4,275,568 A * | 6/1981 | Zielsdorf | ........................ | 62/342 |
| 6,397,932 B1 * | 6/2002 | Calaman et al. | ............ | 165/80.4 |
| 8,079,749 B2 * | 12/2011 | Kitta | ............................. | 366/149 |
| 2008/0151682 A1 * | 6/2008 | Fay et al. | ....................... | 366/98 |

* cited by examiner

*Primary Examiner* — David Sorkin
*Assistant Examiner* — Abbas Rashid
(74) *Attorney, Agent, or Firm* — McNees, Wallace & Nurick, LLC

(57) ABSTRACT

A cooling jacket for use with mixing bowls is provided. This cooling jacket includes a plurality of channel forming structures, wherein each of the plurality of channel forming structures further includes a least one substantially vertical portion and a substantially horizontal portion, and wherein each channel forming structure defines a channel for receiving liquid coolant; and a plurality of pins positioned within the channels either in a predetermined, regular manner or randomly.

11 Claims, 5 Drawing Sheets

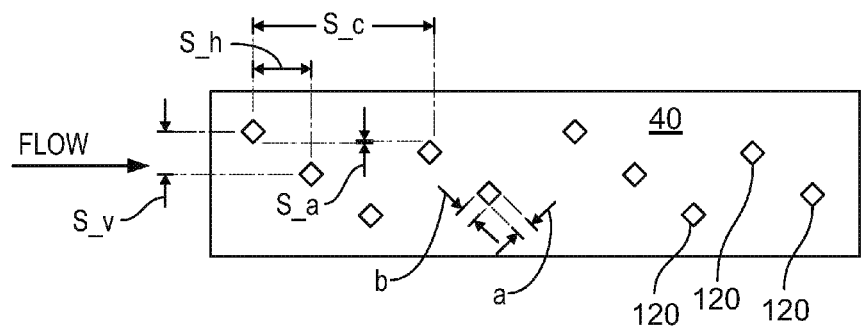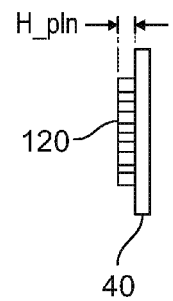
FIG. 9A  FIG. 9B
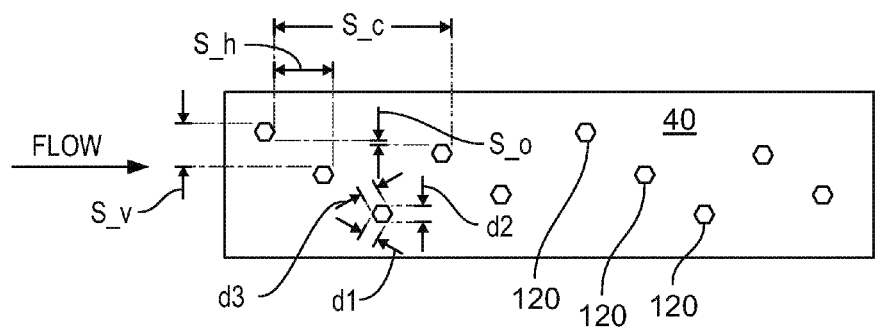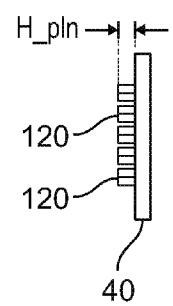
FIG. 10A  FIG. 10B
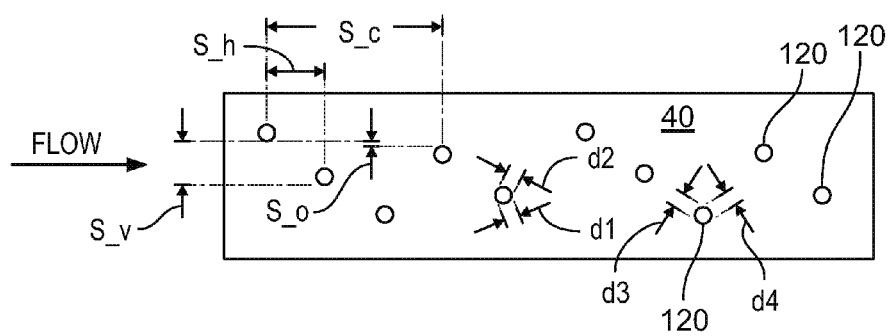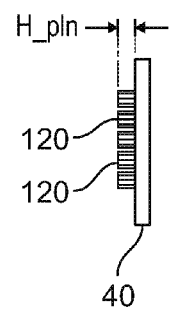
FIG. 11A  FIG. 11B

MIXING BOWL COOLING JACKET WITH TURBULENCE INDUCING STRUCTURES

BACKGROUND OF THE INVENTION

The described invention relates in general to a system and apparatus for mixing viscous substances such as dough, and more specifically to a cooling jacket incorporated into the mixing bowl component of industrial mixers for controlling the temperature of the substance being mixed during the mixing process.

Friction and viscous shear encountered during mixing typically causes a temperature rise in a substance being mixed. This temperature rise becomes more severe as mixing speed increases and can adversely affect a mixing process by making the substance sticky and difficult to process. Accordingly, mixers, particularly dough mixers, are most effective when equipped with some type of temperature control means, whereby the temperature of the substance to be mixed may be stabilized at a predetermined level or maintained below a predetermined threshold. For example, bread dough should be mixed at a temperature of about 78-80° F. A known means for controlling the temperature of a substance being mixed is through the use of a refrigeration jacket attached to the mixing bowl component of a mixer. Bowl refrigeration jackets, also referred to as "cooling jackets" usually include multiple coolant channels that are arranged perpendicular to the ends of a mixing bowl, and which are arrayed around the profile of the mixing bowl. Additional coolant channels may be optionally included on the ends of the mixing bowl.

Large commercial scale dough mixers may be manufactured both with and without mixing bowl cooling jackets based primarily on the type and quantity of dough to be mixed. Dough mixers manufactured with bowl cooling jackets are categorized as having either "indirect" or "direct: cooling. An indirect refrigeration system utilizes cold water, glycol, or brine as a cooling fluid. This cooling fluid is first chilled by a compressed refrigerant system separate from the mixer, and is then pumped to the mixer. The cooling fluid then circulates through the mixing bowl's cooling jacket, which is typically comprised of a series of parallel channels fastened directly to the exterior of the mixing bowl. Heat generated during the mixing process is transferred from the dough, through the material of the mixing bowl, and then into the cooling fluid. After the mixing process is complete, the cooling fluid is then piped back to a storage tank for reuse. This principle may be applied to a "direct" refrigeration system, as well. A direct expansion refrigeration system introduces refrigerant directly into the refrigeration jacket of a mixer to remove excess heat from the dough being mixed. This type of cooling system typically includes a compressor, a condenser, an evaporator, and a receiver. The bowl refrigeration jacket serves as the evaporator in this configuration and the types of refrigerants used in this configuration typically include R134a and MP-39.

Large commercial scale dough mixers may be manufactured both with and without mixing bowl cooling jackets based primarily on the type and quantity of dough to be mixed. The performance, i.e., cooling capacity, of a refrigeration system used with a commercial scale mixer is the ability of the mixing bowl cooling jacket to remove heat from within the mixing bowl during a batch cycle. As previously indicated, major sources for heat generated during the mixing process are dough ingredient temperatures, ambient temperatures around the mixer, and heat generated from friction and shearing forces within the mixing bowl as the dough is processed. In some circumstances, these variables make it difficult or impossible for a mixing bowl cooling jacket to provide adequate cooling. The heat transference in this type of system includes both conduction and convection. Convection is defined by the equation $q=hA\Delta T$, where h is the fluid convection coefficient (BTU/sec·in$^{2. \circ}$ F.), and A is the surface area (in$^2$) in contact with the cooling fluid. The convection coefficient is determined by factors that include the fluid's composition, temperature, velocity, and turbulence. In dough cooling applications, the convection coefficient is most easily increased, and the temperature of the dough thereby decreased, through an increase in the cooling fluid velocity or cooling fluid turbulence. Thus, because increasing the convection coefficient is an effective means for lowering the temperature in certain mixing systems, there is a need for a mixing bowl refrigeration system that includes means for, at a minimum, increasing the convection coefficient during the mixing process.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a mixing system for use with viscous substances is provided. This mixing system includes a mixing apparatus and a mixing bowl mounted within the mixing apparatus. The mixing bowl further includes a bowl sheet and a cooling jacket mounted on the bowl sheet. The cooling jacket further includes a plurality of channel forming structures running parallel to one another across the length of the bowl sheet, wherein each of the plurality of channel forming structures further includes a least one substantially vertical portion relative to the surface of the bowl sheet and a substantially horizontal portion relative to the surface of the bowl sheet, and wherein each channel forming structure defines a channel for receiving liquid coolant. A plurality of turbulence-inducing pins is positioned within the channels. The pins are positioned vertically relative to the surface of the bowl sheet. A source of liquid coolant in fluid communication with the cooling jacket is also provided.

In accordance with another aspect of the present invention, a mixing bowl for use with mixing systems is provided. This mixing bowl includes a bowl sheet and a cooling jacket mounted on the bowl sheet. The cooling jacket further includes a plurality of channel forming structures running parallel to one another across the length of the bowl sheet, wherein each of the plurality of channel forming structures further includes a least one substantially vertical portion relative to the surface of the bowl sheet and a substantially horizontal portion relative to the surface of the bowl sheet, and wherein each channel forming structure defines a channel for receiving liquid coolant. A plurality of turbulence-inducing pins is positioned within the channels. The pins are positioned vertically relative to the surface of the bowl sheet.

In yet another aspect of this invention, a cooling jacket for use with mixing bowls is provided. This cooling jacket includes a plurality of channel forming structures, wherein each of the plurality of channel forming structures further includes a least one substantially vertical portion and a substantially horizontal portion, and wherein each channel forming structure defines a channel for receiving liquid coolant. A plurality of turbulence-inducing pins positioned within the channels.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein:

FIGS. 9a-b provide top and side views of a fourth exemplary arrangement of turbulence-inducing pins within a channel of a mixing bowl cooling jacket;

FIGS. 10a-b provide top and side views of a fifth exemplary arrangement of turbulence-inducing pins within a channel of a mixing bowl cooling jacket;

FIGS. 11a-b provide top and side views of a sixth exemplary arrangement of turbulence-inducing pins within a channel of a mixing bowl cooling jacket.

DETAILED DESCRIPTION OF THE INVENTION

Figure 1:
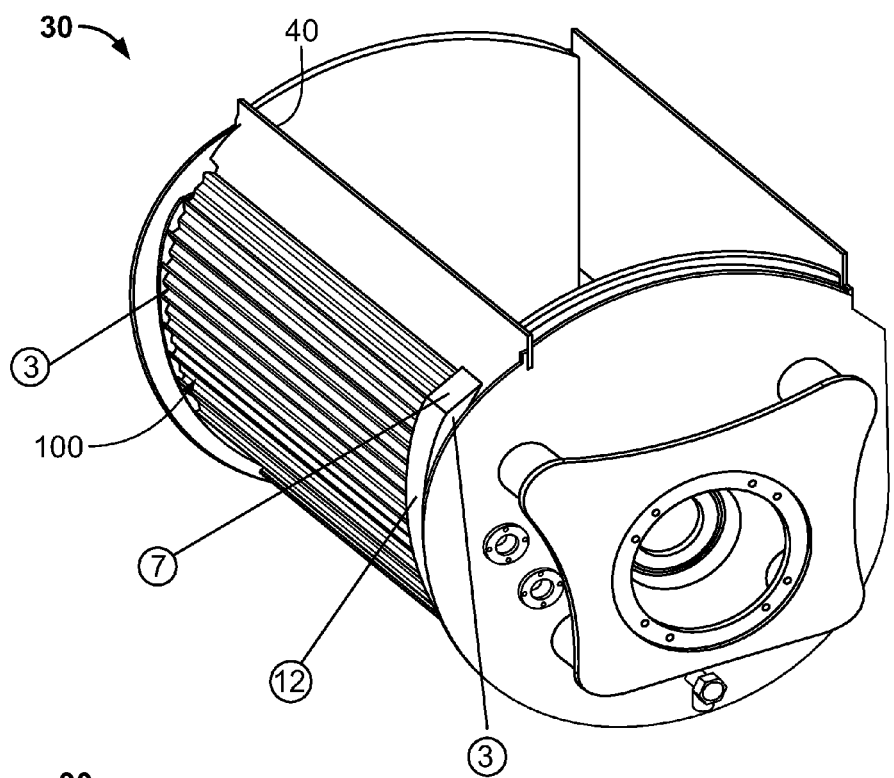
FIG. 1 is a perspective view of an exemplary mixing bowl, wherein a cooling jacket has been mounted on the exterior of the mixing bowl.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates to a refrigerated mixing system that includes structural means for increasing the turbulence of the cooling fluid typically used with mixing bowl cooling jackets that are mounted on mixing bowls in commercial mixers; and for increasing the surface area of the mixing bowl cooling jacket that the cooling fluid contacts. As previously indicated, a first general embodiment of this invention provides a mixing system for use with viscous substances; a second general embodiment of this invention provides a mixing bowl for use with mixing systems; and a third general embodiment of this invention provides a cooling jacket for use with mixing bowls. The term "pin" as used herein refers to any article resembling a rod, post, peg, shaft, pole, or pin. The term "channel" as used herein refers to any form of pipeline, conduit, vessel, or channel through which liquid may flow. With reference now to the Figures, one or more specific embodiments of this invention shall be described in greater detail.

Figure 2:
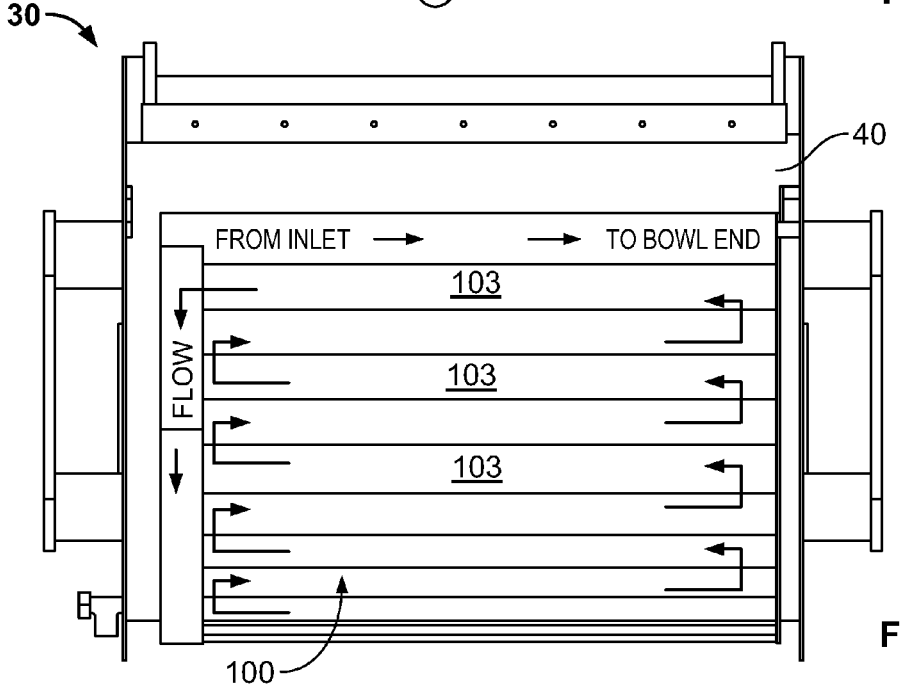
FIG. 2 is a side view of the mixing bowl and cooling jacket of FIG. 1.
Figure 3:
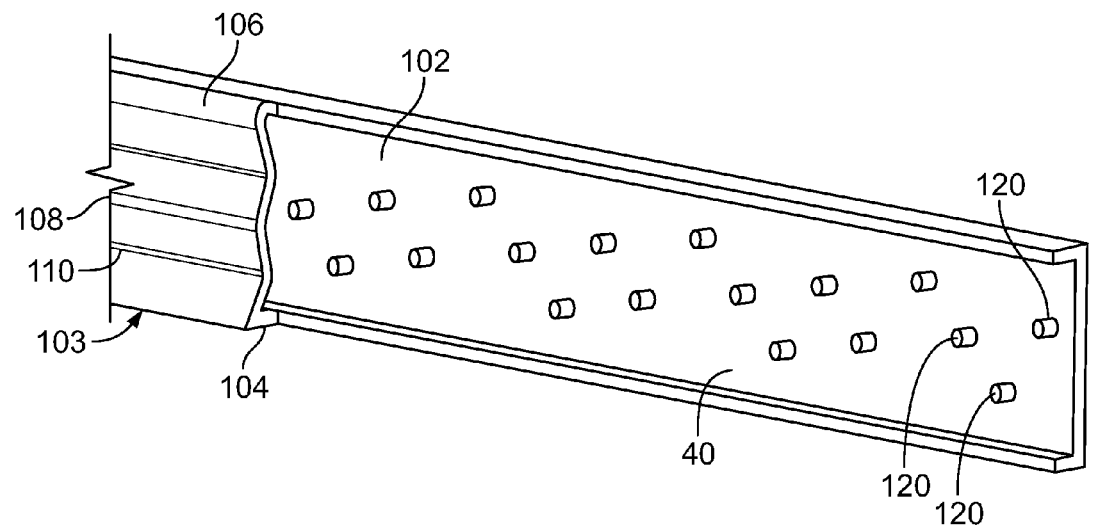
FIG. 3 is a side view of one of the channels of the mixing bowl cooling jacket of FIG. 1, showing an exemplary placement of pins within the channel.

As shown in FIGS. 1-2, the present invention includes a mixing bowl 30, which is used with large-scale commercial or industrial mixers of the type described in U.S. Pat. Nos., 4,275,568 and 4,159,740, both of which are incorporated by reference herein, in their entirety for all purposes. Mixing bowl 30 is typically mounted in a mixing apparatus (not shown in the Figures) and includes a bowl sheet 40, which is surrounded by a bowl cooling jacket 100. Bowl cooling jacket 100 further includes a plurality of parallel coolants channels 102 that run lengthwise across the surface of bowl sheet 40 and which are perpendicular to the ends of bowl sheet 40. Although not shown in the Figures, additional coolant channels may be included in bowl cooling jacket 100, wherein these channels run parallel to the ends of bowl sheet 40. As shown in FIG. 3, each channel forming structure 103 in bowl cooling jacket 100 includes at least one vertical portion 104 and a horizontal portion 106. In some embodiments, horizontal portion 106 further includes a series of "break-lines" that include plurality of parallel ridges 108 and a plurality of parallel valleys 110. As shown in FIG. 1-2, channel-forming structures 103 are arranged in a parallel series on the surface of bowl sheet 40 and welded thereto to form sealed passages for coolant fluid to flow through channels 102.

Figure 4:
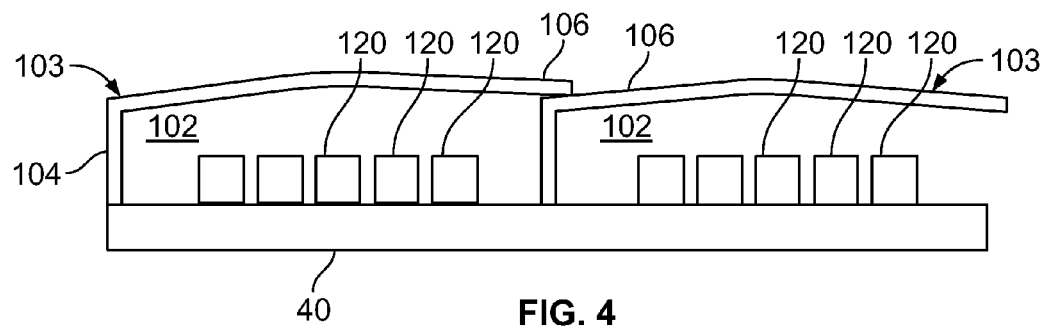
FIG. 4 is a cross sectional view of two of the channels of the mixing bowl cooling jacket of FIG. 1, showing a first exemplary mounting of pins within the channels.
Figure 5:
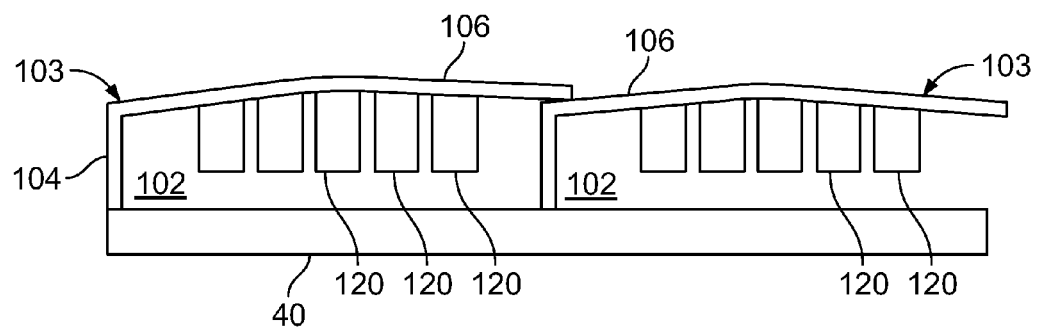
FIG. 5 is a cross sectional view of two of the channels of the mixing bowl cooling jacket of FIG. 1, showing a second exemplary mounting of pins within the channels.
Figures 6A, 6B:
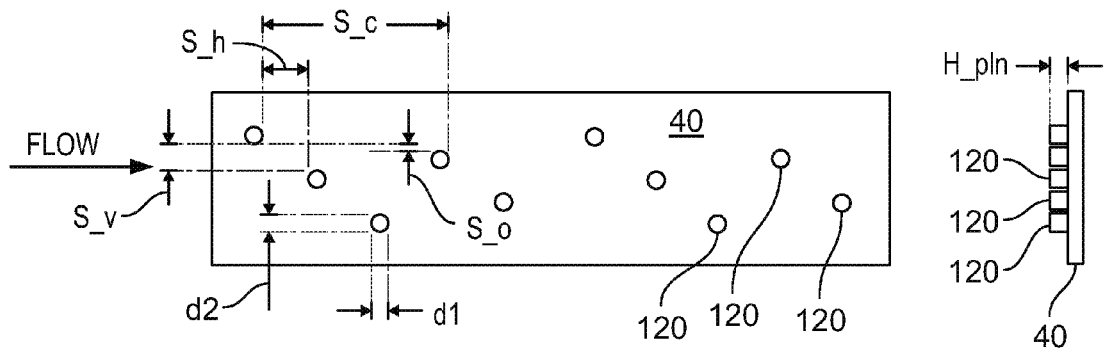
FIGS. 6a-b provide top and side views of a first exemplary arrangement of turbulence-inducing pins within a channel of a mixing bowl cooling jacket.
Figures 7A, 7B:
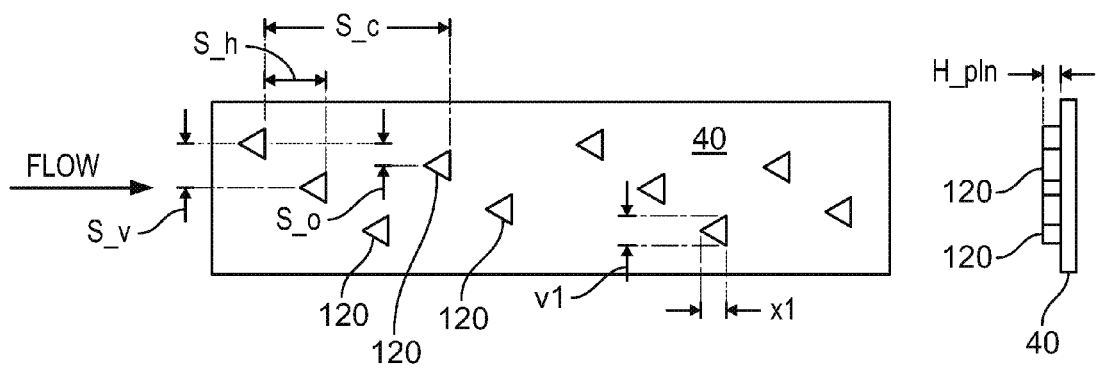
FIGS. 7a-b provide top and side views of a second exemplary arrangement of turbulence-inducing pins within a channel of a mixing bowl cooling jacket.
Figures 8A, 8B:
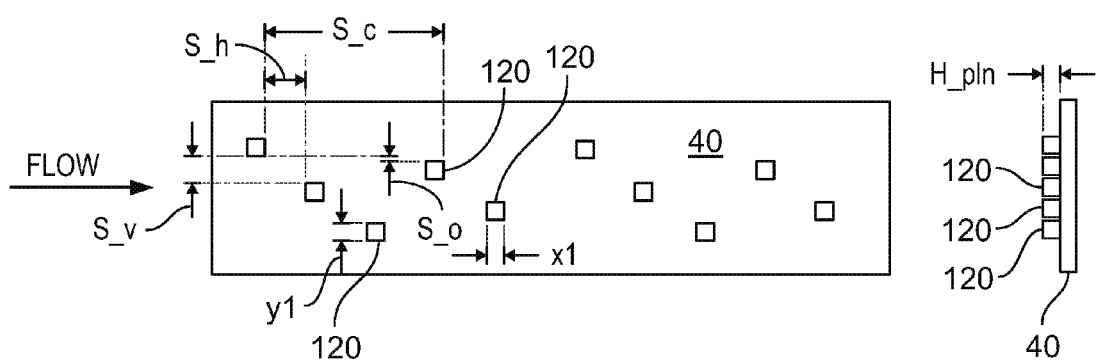
FIGS. 8a-b provide top and side views of a third exemplary arrangement of turbulence-inducing pins within a channel of a mixing bowl cooling jacket.
Figures 12A, 12B:
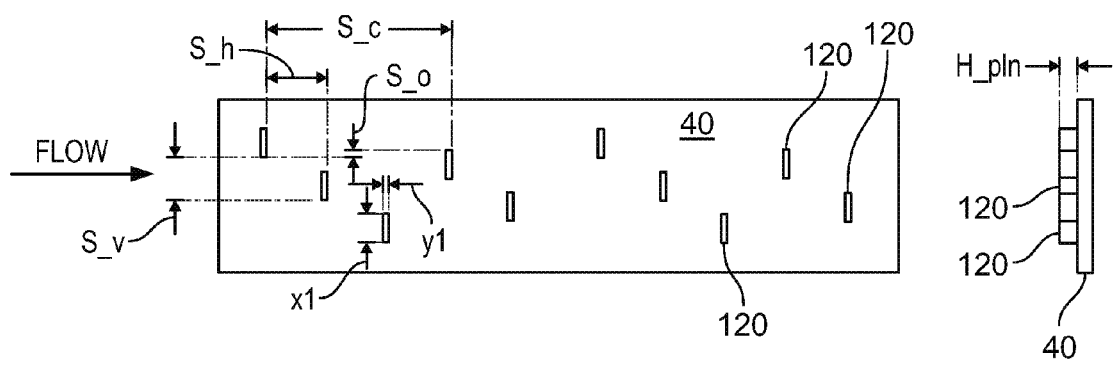
FIGS. 12a-b provide top and side views of a seventh exemplary arrangement of turbulence-inducing pins within a channel of a mixing bowl cooling jacket.

As shown in FIGS. 3-4, a plurality of vertical metal pins (i.e., perpendicular to fluid flow) are mounted on the exterior surface of bowl sheet 40 for inducing turbulence in the flow of liquid coolant through channels 102, thereby increasing the convection coefficient (i.e., heat transfer) of the cooling fluid and enhancing the cooling capacity of bowl cooling jacket 100. Pins 120 also increase the conductive characteristics of bowl cooling jacket 100 by increasing the surface of the cooling jacket that contacts the cooling fluid, and thus may be referred to as "thermally conductive". As shown in FIG. 5, pins 120 may also be mounted on the interior surface of horizontal portion 106. In some embodiments, pins 120 are mounted on both surfaces 40 and 106, and in still other embodiments, pins 120 extend from surface 106 to surface 40, thereby passing completely though the flow of fluid coolant in channels 102 and providing additional structural support to channel forming structures 103.

The present invention increases the cooling capacity of a mixing bowl jacket by both enlarging the cooling surface area and increasing the convective effect of the liquid coolant flowing through the channels of jacket 100. Pins 120 maximize turbulence of the liquid coolant, while increasing the cooling surface of the bowl jacket by over 0.5 square inch per pin. On larger mixers where over 1,000 pins are used, this increase equates to an additional 500 square inches of cooling surface area. Computational Fluid Dynamics (CFD) analyses conducted on jacket channels with and without pins 120 indicated a significant difference between the two configurations when coolant flow rates and the temperature of mixed ingredients remained constant. In a configuration without pins, the laminar flow of liquid coolant in channels 102 did not create significant additional cooling by means of convective effects. With no obstructions in the path of the liquid coolant, the molecules of the coolant continue on a substantially straight path, and the effects of surface friction force the coolant to the center of the channel where there is less resistance to flow. However, in a configuration that included pins 120, the direction of the flow of liquid coolant changed each and every time a pin was encountered by the liquid coolant. These constant changes in direction create a turbulent flow that permits more fluid molecules to contact bowl sheet 40, thereby increasing the heat transfer capacity of the system. As indicated in the tables below, the inclusion of pins 120 in a bowl cooling jacket results in an increase in the overall heat transfer coefficient (U-factor) from 90.6 BTU/Hr·Ft$^2$·° F. to 110 BTU/Hr·Ft$^2$·° F., or an increase of 21.4%. This U-factor represents numerically the maximum amount of heat extractable from a given surface area. These U-factor gains are illustrated in the refrigeration calculation sheets included in the tables that appear below. Also noted is a decrease in the final dough temperature from 82° F. to 76.5° F.

TABLE 1

No pins included in channels of bowl cooling jacket.

| Sampled Data | Values | Units |
|---|---|---|
| Glycol Inlet Temp. | 16.0 | ° F. |
| Glycol Outlet Temp. | 23.5 | ° F. |
| Flow Rate | 80.0 | GPM |
| Average Jacket Temp. | 19.8 | ° F. |
| Heat Transfer Rate | 302035.0 | BTU/Hr |
| Overall Thermal Heat Coefficient | 90.6 | BTU/Hr-ft$^2$-° F. |
| Final Dough Temp. | 82.0 | ° F. |

TABLE 2

Pins included in channels of bowl cooling jacket.

| Sampled Data | Values | Units |
|---|---|---|
| Glycol Inlet Temp. | 16.0 | ° F. |
| Glycol Outlet Temp. | 24.3 | ° F. |
| Flow Rate | 80.0 | GPM |
| Average Jacket Temp. | 20.2 | ° F. |
| Heat Transfer Rate | 333442.0 | BTU/Hr |
| Overall Thermal Heat Coefficient | 110.5 | BTU/Hr-ft$^2$-° F. |
| Final Dough Temp. | 76.5 | ° F. |

As shown (in a non-limiting manner) in FIGS. 6*a-b* through 12*a-b*, pins 102 may be arranged in numerous different random or non-random (i.e., predetermined) configurations within channels 102. Furthermore, the cross-sectional geometries of pins 102 may be substantially curvilinear, rectilinear, or combinations thereof. As shown in the Figures, circular, triangular, square, rectangular, and hexagonal pins, as well as pins having other geometries, are compatible with the present invention.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A mixing system for use with viscous substances, comprising:
    (a) a mixing apparatus;
    (b) a mixing bowl mounted within the mixing apparatus, wherein the mixing bowl further includes:
        (i) a curved bowl sheet; and
        (ii) a cooling jacket mounted on the curved bowl sheet, wherein the cooling jacket further includes a plurality of channel forming structures running parallel to one another across the length of the bowl sheet, and wherein each of the plurality of channel forming structures further includes:
            (a) at least one substantially vertical side portion, relative to the surface of the bowl sheet; and
            (b) a substantially horizontal top portion relative to the surface of the bowl sheet, wherein the substantially top horizontal portion is elevated above the surface of the bowl sheet, and wherein the horizontal top portion further includes a contoured region having a plurality of parallel ridges and parallel valleys formed therein and running lengthwise therethrough; and
            (c) wherein each channel forming structure defines a channel for receiving liquid coolant; and
        (iii) a plurality of pins positioned within the channels, wherein the pins are positioned vertically relative to the surface of the bowl sheet; wherein each pin in the plurality of pins is mounted either on the substantially horizontal portion of the channel forming structure or on the surface of the bowl sheet, and wherein each pin in the plurality of pins further includes an end which is fully exposed to the channel; and
    (c) a source of liquid coolant, wherein the source of coolant is in fluid communication with the cooling jacket for reducing the temperature of a viscous substance being mixed during the mixing process, and wherein the pins positioned within the channels are operative to induce turbulence in the liquid coolant, and wherein each of the plurality of pins increases the cooling surface of the cooling jacket by greater than 0.5 square inch per pin.

2. The mixing apparatus of claim 1, wherein the mixing apparatus is adapted for use with bread dough.

3. The mixing apparatus of claim 1, wherein the cooling jacket is adapted for use with either an indirect refrigeration system or a direct refrigeration system.

4. The mixing apparatus of claim 1, wherein the cross-sectional geometry of the pins in the plurality of pins is substantially circular, triangular, square, rectangular, hexagonal, or combinations thereof.

5. The mixing apparatus of claim 1, wherein the pins in the plurality of pins are arranged in a predetermined, regular pattern within each channel.

6. The mixing apparatus of claim 1, wherein the pins in the plurality of pins are arranged randomly within each channel.

7. A mixing bowl for use with mixing systems, comprising:
    (a) a curved bowl sheet;
    (b) a cooling jacket mounted on the curved bowl sheet, wherein the cooling jacket further includes a plurality of channel forming structures running parallel to one another across the length of the bowl sheet, and wherein each of the plurality of channel forming structures further includes:
(i) at least one substantially vertical side portion, relative to the surface of the bowl sheet; and
(ii) a substantially horizontal top portion relative to the surface of the bowl sheet, wherein the substantially top horizontal portion is elevated above the surface of the bowl sheet, and wherein the horizontal top portion further includes a contoured region having a plurality of parallel ridges and parallel valleys formed therein and running lengthwise therethrough; and
(iii) wherein each channel forming structure defines a channel for receiving liquid coolant; and
(c) a plurality of pins positioned within the channels, wherein the pins are positioned vertically relative to the surface of the bowl sheet, wherein each pin in the plurality of pins is mounted either on the substantially horizontal portion of the channel forming structure or on the surface of the bowl sheet, wherein each pin in the plurality of pins further includes an end which is fully exposed to the channel; and wherein each of the pins increases the cooling surface of the cooling jacket by greater than 0.5 square inch per pin.

8. The mixing bowl of claim 7, wherein the cooling jacket is adapted for use with either an indirect refrigeration system or a direct refrigeration system.

9. The mixing bowl of claim 7, wherein the cross-sectional geometry of the pins in the plurality of pins is substantially circular, triangular, square, rectangular, hexagonal, or combinations thereof.

10. The mixing bowl of claim 7, wherein the pins in the plurality of pins are arranged in a predetermined, regular pattern within each channel.

11. The mixing bowl of claim 7, wherein the pins in the plurality of pins are arranged randomly within each channel.

* * * * *